United States Patent [19]

Japikse et al.

[11] 4,288,378

[45] Sep. 8, 1981

[54] METHOD OF PREPARING AN ENRICHED PEANUT OIL PEANUT BUTTER STABILIZER

[75] Inventors: Cornelis H. Japikse; Irwin B. Simon, both of Cincinnati, Ohio

[73] Assignee: The Procter & Gamble Company, Cincinnati, Ohio

[21] Appl. No.: 41,668

[22] Filed: May 23, 1979

[51] Int. Cl.[3] .......................... C11C 3/12; A23D 5/00

[52] U.S. Cl. ................................ 260/409; 260/410.7; 426/607; 426/633

[58] Field of Search .............................. 260/409, 410.7

[56] References Cited

U.S. PATENT DOCUMENTS

| | | | |
|---|---|---|---|
| 2,442,538 | 6/1948 | Abbott | 260/409 |
| 2,521,219 | 9/1950 | Holman | 99/118 |
| 3,129,102 | 4/1964 | Sanders | 99/128 |
| 3,265,507 | 8/1966 | Japikse | 99/118 |
| 3,397,997 | 8/1968 | Japikse | 99/128 |
| 3,425,842 | 2/1969 | Japikse | 99/124 |
| 3,425,843 | 2/1969 | Japikse | 99/124 |
| 3,431,116 | 3/1969 | Feuge | 260/410.7 |
| 3,619,207 | 11/1971 | Dzarik | 99/128 |
| 3,671,267 | 6/1972 | Gooding | 99/128 |

OTHER PUBLICATIONS

Hawley, H. et al., J. Am. Oil Chemists' Soc., vol. 33, pp. 29–35 (1956).

Weiss, "Food Oils and Their Uses", Avi Pub. Co., (1970), p. 179.

*Primary Examiner*—John F. Niebling
*Attorney, Agent, or Firm*—Leonard Williamson; Eric W. Guttag; Richard C. Witte

[57] ABSTRACT

An enriched, hydrogenated peanut oil-based peanut butter stabilizer and a method of preparing said peanut butter stabilizer comprising the steps of: (a) randomly interesterifying (randomizing) a first mixture of from 0% to 70% hydrogenated peanut oil (hardstock) and from 30% to 100% unhydrogenated peanut oil, preferably 30% to 70% hydrogenated peanut oil and 30% to 70% unhydrogenated peanut oil; (b) fractionally crystallizing from said first mixture a second mixture of triglycerides having at least 10% fatty acids having from 20 to 24 carbon atoms; and (c) substantially completely hydrogenating said second mixture to form said enriched hydrogenated peanut oil-based peanut butter stabilizer.

9 Claims, 12 Drawing Figures

PERCENT LONG CHAIN FATTY ACIDS IN SOLIDS FROM FRACTIONATION OF RANDOMLY REARRANGED PEANUT OIL AND PEANUT OIL XXX

SOLIDS YIELD AND LONG CHAIN FATTY ACID CONCENTRATION: MODEL CRYSTALLIZER
SOLVENT: HEXANE
TEMPERATURE: 32° F.
MISCELLA: 33%

METHOD OF PREPARING AN ENRICHED PEANUT OIL PEANUT BUTTER STABILIZER

BACKGROUND OF THE PRIOR ART

To employ stabilizers for the prevention of oil and solids separation in a peanut butter product is well known in the prior art. In general, the prior art teaches that the stabilizers can be partially or completely hydrogenated natural fats such as peanut oil, corn oil, cottonseed oil, linseed oil, palm oil, whale oil and other marine oils, alone or in combination. See U.S. Pat. No. 3,619,207, Nov. 9, 1971 to Dzurik, Hair, Hardy and Purves, (Procter & Gamble). While stabilizers form a spongy matrix of fat crystals which holds the peanut solids in suspension and the crystal structure of the stabilizer is important (Weiss, "Food Oils and Their Uses" [Avi Publishing Co., 1970] at 179), the prior art teaches the use of beta-prime tending hard fats such as hydrogenated peanut oil (U.S. Pat. No. 3,129,102, Apr. 14, 1964 to Sanders, Procter & Gamble), beta-tending hardfats such as hydrogenated peanut oil (U.S. Pat. No. 2,521,219, Sept. 5, 1950 to Holman et al., Procter & Gamble) and a combination of beta and non-beta hardfats such as hydrogenated soy bean oil and hydrogenated rapeseed oil (U.S. Pat. No. 3,265,507, Aug. 9, 1966 to Japikse, Procter & Gamble). Japikse teaches a peanut butter stabilizer which is a substantially completely hydrogenated hardstock consisting essentially of a blend of a beta-phase tending hardstock and a non-beta phase tending hardstock having a substantial proportion of fatty acid groups having from 20 to 24 carbon atoms. Suitable beta phase tending hardstocks include hard fats which have been subjected to molecular rearrangement and hydrogenation processes whereby a major amount of tristearin or tripalmitin, for example, is caused to be present in the rearranged product. Suitable non-beta phase tending hardstocks include hydrogenated rapeseed oil, mustard seed oil, and fish oils.

U.S. Pat. No. 3,671,267, June 20, 1972 to Gooding et al. (CPC International), teaches a peanut butter composition stabilized by the "stabilizing 30% of partially hydrogenated peanut oil". Gooding teaches recovering this portion by crystallization. The stabilizer which is high in symmetrical $US_2G$ (a glyceride containing 1 unsaturated fatty acid and 2 saturated fatty acids), has a controlled amount of $S_3G$, and is low in $U_2SG$ and/or unsymmetrical $US_2G$. Preferred ratios of these components are: 0.7 to 1.7 parts $US_2G$: 1 part $S_3G$: less than about 2 parts total $U_2SG$ and/or unsymmetrical $US_2G$. Gooding et al. do not teach molecular rearrangement and produces stabilizer compositions having a much lower content of long-chain (C-20 to C-24) fatty acids as that of the present invention.

Random and directed interesterification procedures are known in the art. See, for example, Weiss (supra) pp. 60–62 and Hawley and Holman, "Directed Interesterification as a New Processing Tool for Lard" in J. Am. Oil Chemists' Soc. 33, 29–35 (1956). The purpose of the procedure is to molecularly rearrange the fatty acids of triglycerides according to the laws of chance. Then, from the randomized mixture of triglycerides, the desired triglycerides can be obtained, for example, by crystallization. In a directed interesterification, the desired triglycerides crystallize as they are formed, thus "driving" the reaction toward the desired triglycerides. In general, the temperature at which the crystallization is carried out determines which fraction of triglycerides are obtained.

While the prior art teaches the use of hydrogenated peanut oil as well as partially hydrogenated peanut oil as a stabilizer in peanut butter, no known art teaches the use of a fractionally crystallized portion of molecularly rearranged mixtures of hydrogenated and unhydrogenated peanut oils. While hydrogenation, random and directed interesterification and fractional crystallization of triglycerides are known, no one appears to have recognized these chemical process tools as means to treat peanut oil triglyceride to make an all peanut butter stabilizer as an alternative to prior art rapeseed oil-based stabilizers.

OBJECTS OF THE PRESENT INVENTION

It is an object of the present invention to provide a peanut butter stabilizer having functionality substantially equivalent to rapeseed oil-based stabilizers.

Another object of the present invention is to provide a stabilizer made from peanut oil-based material.

Yet another object of the present invention is to provide a process for making stabilizers which would be alternatives to the rapeseed oil-based peanut butter stabilizers.

SUMMARY OF THE INVENTION

A method of preparing a peanut butter stabilizer comprising the steps of: (a) randomly interesterifying a first mixture of from 0% to 70% hydrogenated peanut oil and from 30% to 100% unhydrogenated peanut oil; a preferred first mixture comprises 30% to 70% hydrogenated and 30% to 100% unhydrogenated peanut oil; (b) fractionally crystallizing from said first mixture a second mixture of triglycerides having at least 10% fatty acids having from 20 to 24 carbon atoms; and (c) substantially completely hydrogenating said second mixture to form said peanut butter stabilizer.

DETAILED DESCRIPTION OF INVENTION

The present invention relates to a process for making a peanut butter stabilizer utilizing peanut oil as a starting material. The resulting peanut butter has characteristics substantially identical to those of a standard peanut butter designated as "J-6". Experience in making an improved peanut butter stabilizer system had shown that the minimum amount of long chain fatty acid in rapeseed was 25% and thus 12.5% in the total hardstock portion of the stabilizer system. Actual isomer identifications and literature data indicated that specific triglyceride isomers are present in rapeseed oil in approximately the proportions predicted by a random distribution of fatty acids. Table 1 shows these proportions for rapeseed hardstock and rapeseed/soybean (R/S) combined.

TABLE 1

| Isomers | Rapeseed | Rapeseed/Soybean |
|---|---|---|
| Tri-long chain | 1.6% | 0.8% |
| Di-long chain | 14.1% | 7.0% |
| Mono-long chain | 42.2% | 21.1% |
| No-long chain | 42.2% | 71.1% |

Figure 1A:
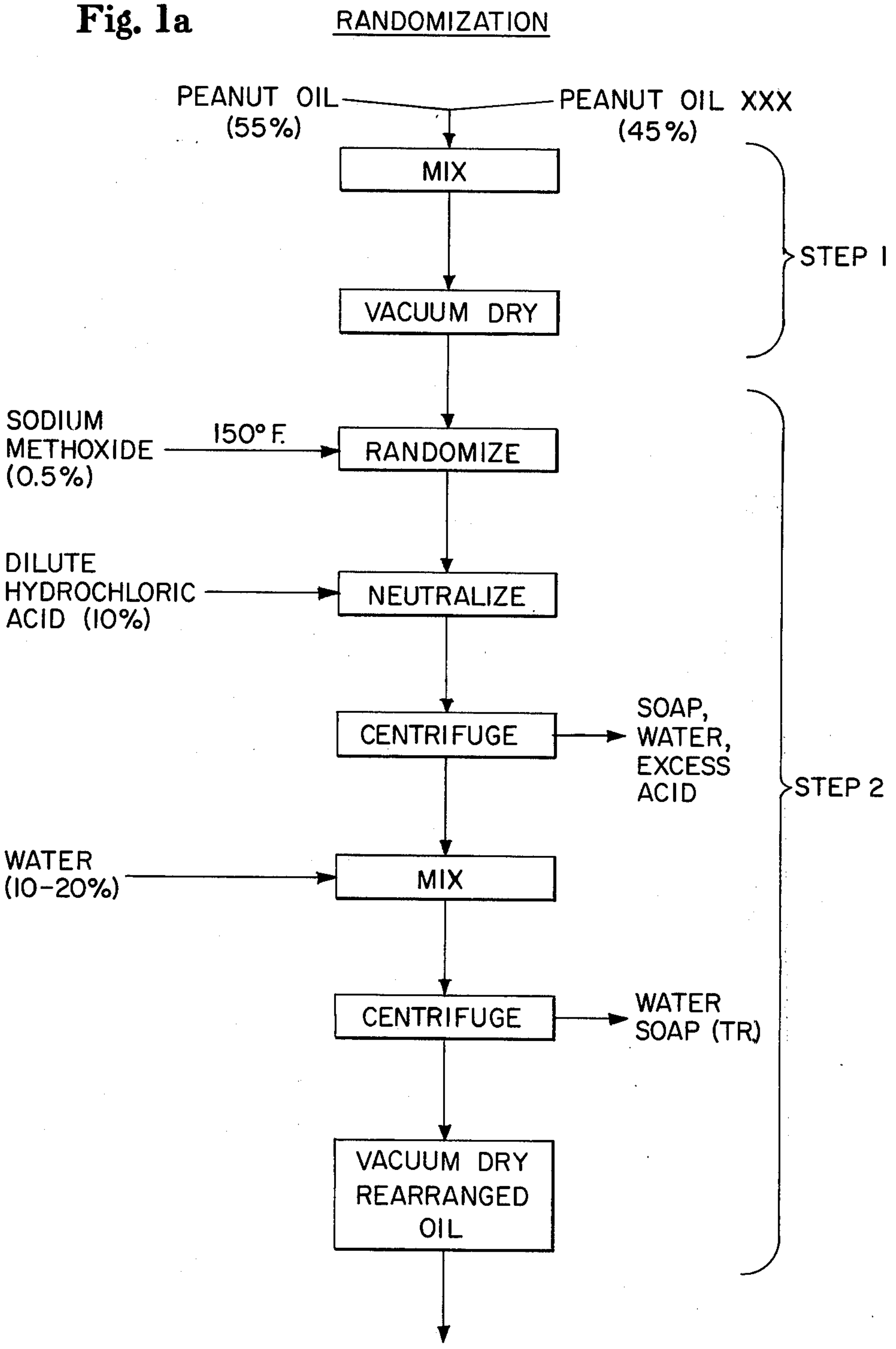
FIG. 1*a* represents a block diagram of the process of the present invention.
Figure 1B:
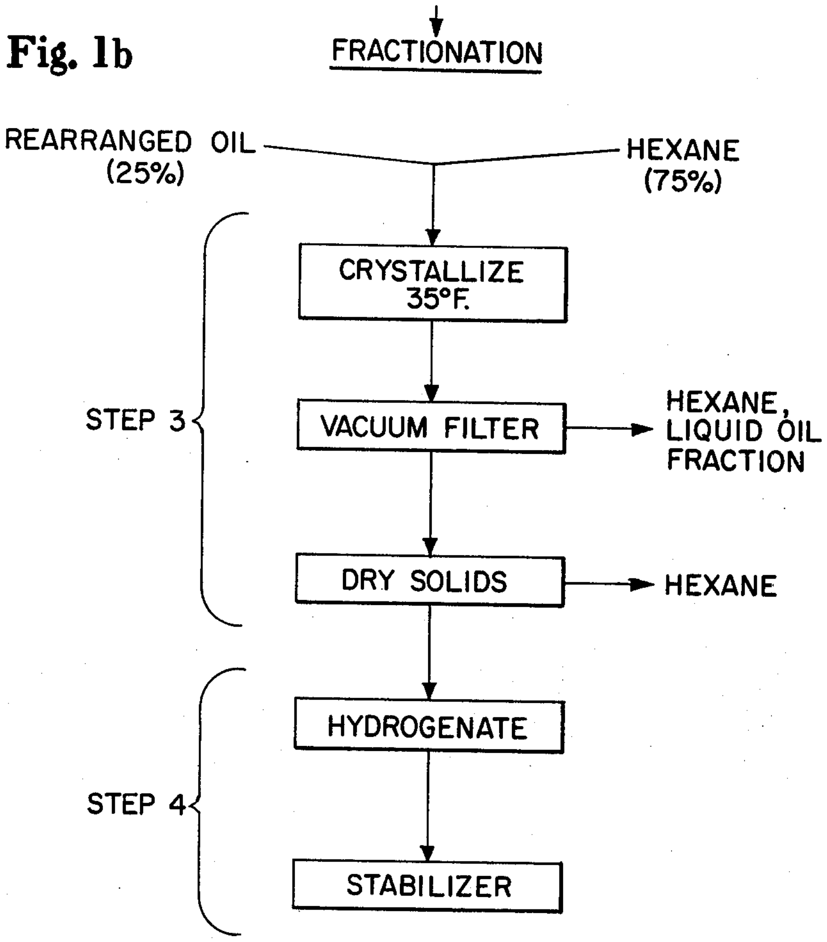
FIG. 1*b* is a continuation of the block diagram of FIG. 1*a*.

Since peanut oil contains only 5 to 6% long chain fatty acid, it was heretofore unsatisfactory as a stabilizer because higher concentration of this component was required. To accomplish this, peanut oil was combined with peanut oil hardstock and randomly rearranged. This mixture was then fractionally crystallized from solvent, the solids recovered and hardened to an iodine value of less than 4 (I4). FIG. 1 gives a block diagram of the process and the reaction products involved.

This scheme, shown in FIG. 1, produces an estimated concentration of the long chain fatty acids as follows:

| | % Saturates | % Long Chains | % Tri-saturates | % Di-saturates |
|---|---|---|---|---|
| Step 1 | | | | |
| Mix peanut oil and peanut oil hardstock (XXX) | 56 | 5 | 45 | 5.3 |
| Step 2 | | | | |
| Rearrangement: Distribute fatty acids randomly on all triglycerides present | 56 | 5 | 17.6 | 41.4 |
| Step 3 | | | | |
| Fractionate: Isolate all trisaturates and those disaturates which contain long chain fatty acids | 94 | 12.5 | 82.4 | 17.6 |

-continued

| | % Saturates | % Long Chains | % Tri-saturates | % Di-saturates |
|---|---|---|---|---|
| Step 4 | | | | |
| Harden: Hydrogenate isolated solids to an iodine value less than 4 | ≈100 | 12.5 | ≈100 | ≈0 |

Table 2 shows the triglyceride isomers which will be present after rearrangement, fractionation and hardening.

TABLE 2

Comparison of Triglyceride Isomer composition of fractionated rearranged peanut oil and Rapeseed/Soybean Stabilizers.

| Isomers | Rapeseed/Soybean | FRPNO |
|---|---|---|
| Tri-long chain | 0.8% | 0.06% |
| Di-Long chain | 7.0% | 3.3% |
| Mono-Long chain | 21.1% | 34.2% |
| No-long chain | 71.1% | 62.3% |

Thus, although the required level of long chain fatty acids will be obtained by the randomization/fractionation scheme, an exact triglyceride isomer match will not be achieved. This stabilizer was surprisingly effectively identical to the R/S stabilizer as tested in an identical peanut butter formulation; response to processing conditions and finished product characteristics were studied in detail.

EXAMPLE I

To quantify the time and temperature requirements for the random rearrangement of peanut oil/peanut oil hardstock mixtures. Dried peanut oil and hardstock were added to a jacketed, nitrogen blanketed refining kettle and brought to reaction temperature (150°-180° F.). Sodium methoxide (0.5% typically) was added and the reaction allowed to proceed. Samples were taken periodically and neutralized with 200% of the stoichiometrically required amount of dilute (10%) hydrochloric acid. The foots formed by neutralization were removed and the oil vacuum dried. The solids content index (SCI) at 70°, 80°, 92° and 105° F. of samples tempered at 80° F. was determined and used to follow the reaction.

Figure 3:
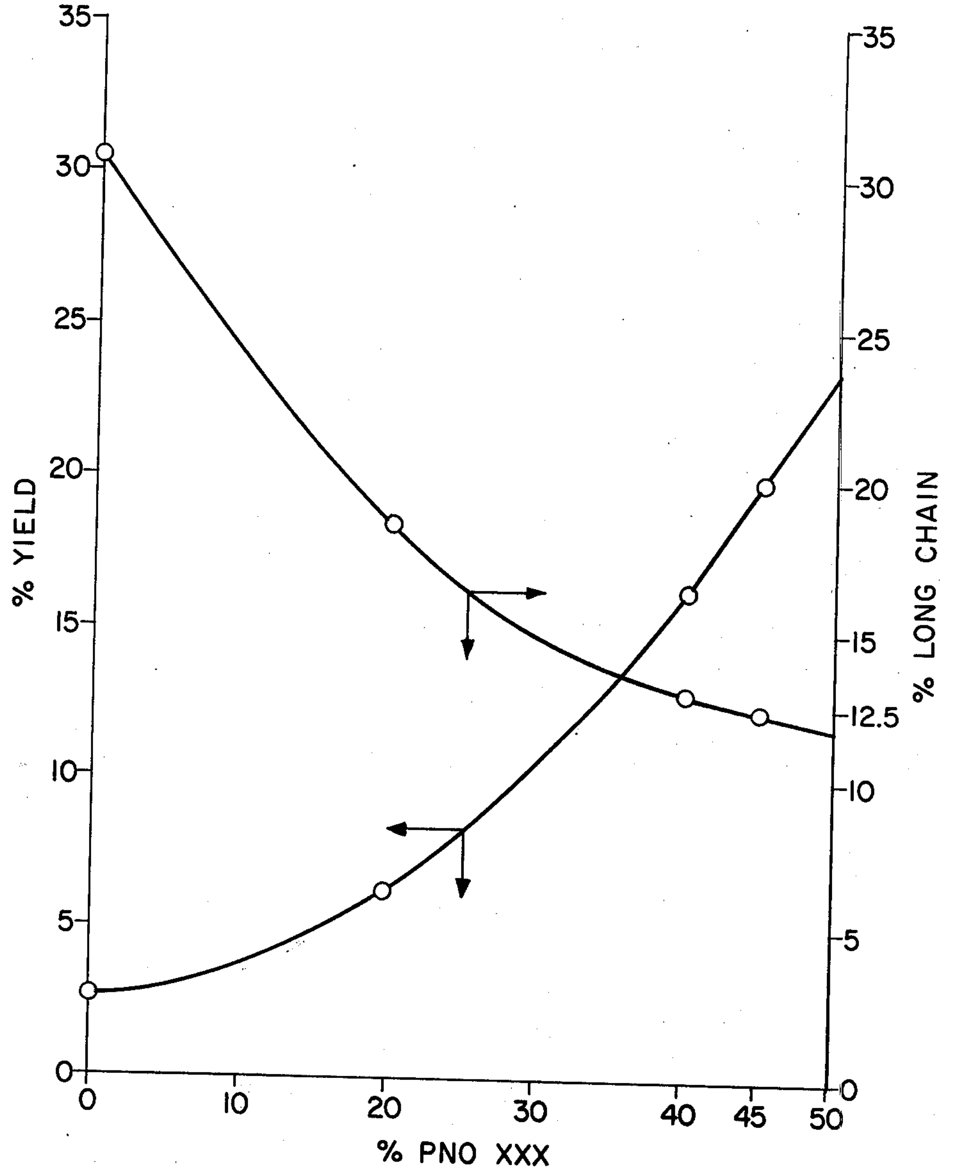
FIG. 3 represents plots of percent solids yield and percent long chain fatty acids versus percent initial peanut oil hardstock for a randomized and fractionally crystallized peanut oil/hardstock mixture.

A model system consisting of a mixture of 55% oil and 45% hardstock was considered first. The oil has the same level of saturated fatty acids as peanut oil, 20%, but only one type of saturate, stearic for example, and one type of unsaturate, for instance oleic. The hardstock is like peanut oil hardstock but with only one fatty acid type, stearic. Table 3 details the reactions which take place during randomization—fatty acids are distinguished as S saturated, or U unsaturated. Initially, due to the high level of UUU, and UUS/USU species from the oil and SSS species from the hardstock, reactions like (1) and (2) will predominate. As a result, the trisaturate (SSS) content of the mixture will decrease dramatically. The SCI at 105° F., which is a measure of the trisaturate present, can be used to follow this portion of the randomization. As the randomization proceeds, the concentration of USS and UUS species increase and the other reactions noted take place more often. Changes in the SCI at 70°, 80° and 92° which measure disaturates plus trisaturates can be used to observe the final changes in triglyceride isomer composition which take place. For a two component system, saturates and unsaturates, when the SCI at 70°, 80°, 92° and 105° F. no longer change each forward and back reaction (1) and (1)' through (7) and (7)' must be taking place with equal frequency. FIG. 3 shows the calculated change in SCI of a 55% oil/45% hardstock mixture after randomization. Theoretical percent solids for S=stearic, U=oleic has been assumed to be equal to the SCI.

In a multicomponent system, where more than one type of saturated and unsaturated fatty acid is involved, actual isomer identification would be required to insure that randomization has been completed. No accurate method of isomer identification is presently available. Determination of the SCI at 70°, 80°, 92° and 105° F. would not be sufficient to follow reactions like oleodipalmitan+oleodistearin→2 oleopalmitostearin taking place in solution.

TABLE 3

| | | |
|---|---|---|
| (1) | UUS + SSS — SUS + SUS | (1)' |
| | UUS + SSS — SUS + USS | |
| | UUS + SSS — USS + USS | |
| | USU + SSS — USS + USS | |
| | USU + SSS — USS + SUS | |
| | USU + SSS — SUS + SUS | |
| (2) | UUU + SSS — UUS + USS | (2)' |
| | UUU + SSS — UUS + SUS | |
| | UUU + SSS — USU + USS | |
| | UUU + SSS — USU + SUS | |
| (3) | USS + SSS — SSS + SUS | (3)' |
| (4) | UUS + USS — SUS + USU | (4)' |
| | UUS + USS — USS + USU | |
| | UUS + USS — SUS + UUS | |
| (5) | UUS + UUS — UUU + USS | (5)' |
| | UUS + UUS — UUU + SUS | |
| | USU + UUS — UUU + USS | |
| | USU + UUS — UUU + USS | |
| | USU + USU — UUU + USS | |
| | UUS + USS — UUU + SUS | |
| | UUS + UUS — USU + UUS | |
| | UUS + UUS — USU + USU | |
| | UUS + USU — USU + USU | |
| (6) | UUU + UUS — USU + UUU | (6)' |
| (7) | SUS + SUS — USS + SUS | (7)' |
| | USS + USS — SUS + USS | |
| | USS + USS — SUS + SUS | |

This is due to the closeness of the melting and solidification points of these three species, their mutual interference in solution during the measurement of the SCI and the inherent inaccuracy of the SCI itself.

Figure 2:
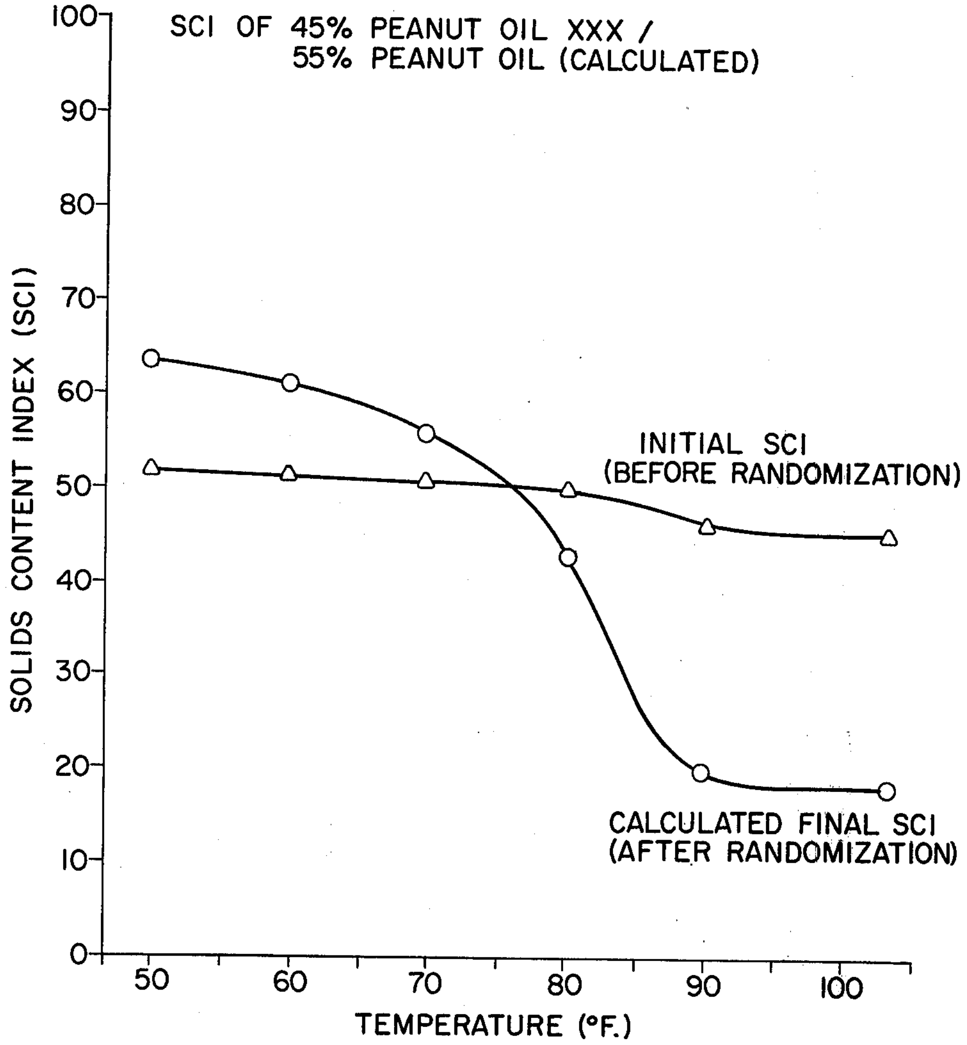
FIG. 2 represents a plot of solids content index versus temperature for a peanut oil mixture before and after randomization.

As an approximation, it is possible, however, to assume that all fatty acids leave one triglyceride and attach to another at the same rate; i.e. that there is no major steric consideration which would make oleodipalmitan, for example, more or less likely to react than oleopalmitostearin. If this is true SCI is adequate for following the reaction, since the total change in trisaturate or disaturate will still take place. FIG. 2 shows the calculated change in SCI during the reaction for the multicomponent system, 55% peanut oil and 45% peanut oil hardstock. As with the two component system, SCI has been assumed to be equal to percent solids. While this is not quantitatively accurate, it does give a proper qualitative shape for the SCI curve.

EXAMPLE II

Fractionation of the randomized peanut oil/peanut oil hardstock was used to isolate the triglycerides which have a high percentage of long chain fatty acids. Reaction 1, below, shows how by mixing peanut oil and hardstock, and by randomization followed by fractionation, an isolate high in long chain fatty acids can be obtained.

Reaction 1

| | | |
|---|---|---|
| 45% PEANUT OIL HARDSTOCK | | 55% PEANUT OIL |
| Fatty Acid Composition: | 5% Long Chain (L)<br>95% other saturates (S) | + 5% Long Chain (L)<br>15% other saturates (S)<br>80% Unsaturates (U) |
| Mixed and Randomized → | | 5% Long Chain (L)<br>41% Other Saturates (S)<br>44% Unsaturates (U) |
| Triglyceride Isomer Composition: (in order of highest melting point | | LLL, LLS, LSS<br>SSS<br>LLU, LSU Cut Off Point |
| | | SSU<br>LUU, SUU<br>UUU |

If a separation is made by fractional crystallization at the point indicated, a 25% yield of solids containing over 12% long chain fatty acids can be made. FIG. 3 shows the calculated results of fractional crystallizations of peanut oil/peanut oil hardstock mixtures; in other words, the solids yield and percent long chain is shown as a function of percent peanut oil hardstock; peanut oil/peanut oil hardstock mixtures are randomized and recovered from solvent to isolate all trisaturates and only disaturates containing long chains. Given the preferred and probable requirement, indicated above, of needing at least 12.5% long chain fatty acids, and wanting a maximum product yield, a 45% peanut oil hardstock/55% peanut oil mixture appeared most attractive.

The effects of time, temperature, miscella level (percent oil in solvent), reactor size and type of solvent on the solids yield and percent long chain fatty acid from fractional crystallizations of randomized oils was studied. A preliminary optimization was achieved and product produced for testing in peanut butter.

The fractionated, rearranged peanut oil was hardened to less than I4 to produce a stabilizer for peanut butter. Tests were conducted to determine the effects of processing conditions. Finished product characteristics were examined in detail and compared with those made with the R/S stabilizer system.

RESULTS AND DISCUSSION

1. Vacuum Drying (a) Drying of Peanut Oil/Peanut Oil Hardstock

Vacuum drying is required to remove even the small amount of moisture present in the refined oil and hardstock. If this water is not eliminated it will react with and inactivate the sodium methoxide catalyst by:

$$NaOCH_3+H_2O \rightarrow NaOH+CH_3OH$$

0.1% of water will inactivate 0.3% of sodium methoxide catalyst. The NaOH produced will react with the fatty acid moieties separated from triglycerides during the randomization reaction. Drying could be replaced by the addition of excess sodium methoxide but this would be uneconomical. Actual pilot plant operation reduced the moisture content to less than 0.2%.

(b) Drying of the Randomized Oil

After randomization, neutralization, initial removal of soap and water, and water washing the oil will be crystallized from solvent. In order to isolate the required solids fraction the oil/solvent mixture must be essentially completely dry. The maximum amount of water which could be tolerated was not determined but the 0.06% obtained by vacuum drying proved satisfactory.

(c) Equipment

A tangential spray vacuum dried was used to dry the peanut oil/hardstock mixtures described above. Typical operating conditions are given in Table 3 below. The operation of the drier was not optimized. Specifications for the vacuum driers are repeated in Tables 4 and 5 below.

TABLE 3

| DRYING OF PEANUT OIL/PEANUT OIL HARDSTOCK | | |
|---|---|---|
| Moisture Content in (% $H_2O$ by weight) | Temp. Product in ($T_1$) (°F.) | Product Rate (Lbs/Hr) |
| 0.1-0.15 | 160-180 | 130 |
| Temp. Steam in (°F.) | Temp. Product into Drier ($T_2$) (°F.) | Vacuum Drier Pressure mm Hg Abs. |
| 360 | 275-290 | 6 |
| Temp. Water in (°F.) | Temp. Product Out ($T_3$) (°F.) | Moisture Content Out (% $H_2O$ by Weight) |
| 145-150 | 150-170 | 0.01-0.02 |

TABLE 4

| VACUUM DRIER OPERATING CONDITIONS TANGENTIAL SPRAY TYPE | | |
|---|---|---|
| Inlet Moisture Content | 0.1 | 0.5 |
| Outlet Moisture Content | 0.02 | 0.06 |
| Inlet Temperature | 260° F. | |
| Vacuum | 10MM Hg ABS. | |
| Column Length | 10′ | |
| Column Diameter | 2′ | |
| Nozzle | ¼" pipe | |

TABLE 5

| VACUUM DRIER OPERATING CONDITIONS PACKED COLUMN | | |
|---|---|---|
| Inlet Moisture Content | 0.1 | 0.5 |
| Outlet Moisture Content | 0.02 | 0.06 |
| Inlet Temperature | 220° F. | |
| Vacuum | 25MM Hg ABS | |
| Column length | ′ Packed | |
| Column Diameter | 2.5′ | |
| Packing | 1" St. St. Pall Rings | |

2. Randomization

Nitrogen Protection

During several early runs no randomization took place. The apparent cause was the moisture from the air in the pilot plant area. Additionally, at the temperatures maintained for randomization (150°-180° F.) some oxidation of the oil could take place. To prevent both moisture and oxygen from reaching the oil a nitrogen blanket was provided for the refining kettle. After its installation, there were no further failures in randomization and the color of the neutralized oil improved.

Agitation

A two-bladed turbine agitator was run at slow speed, approximately 200 RPM to keep the sodium methoxide catalyst suspended. Although some agitation is required, the optimum agitator type and its associated power requirement was not determined. A baffled tank and tubine agitator was provided for in the flow sheet.

Time-Temperature Requirements

Figure 4:
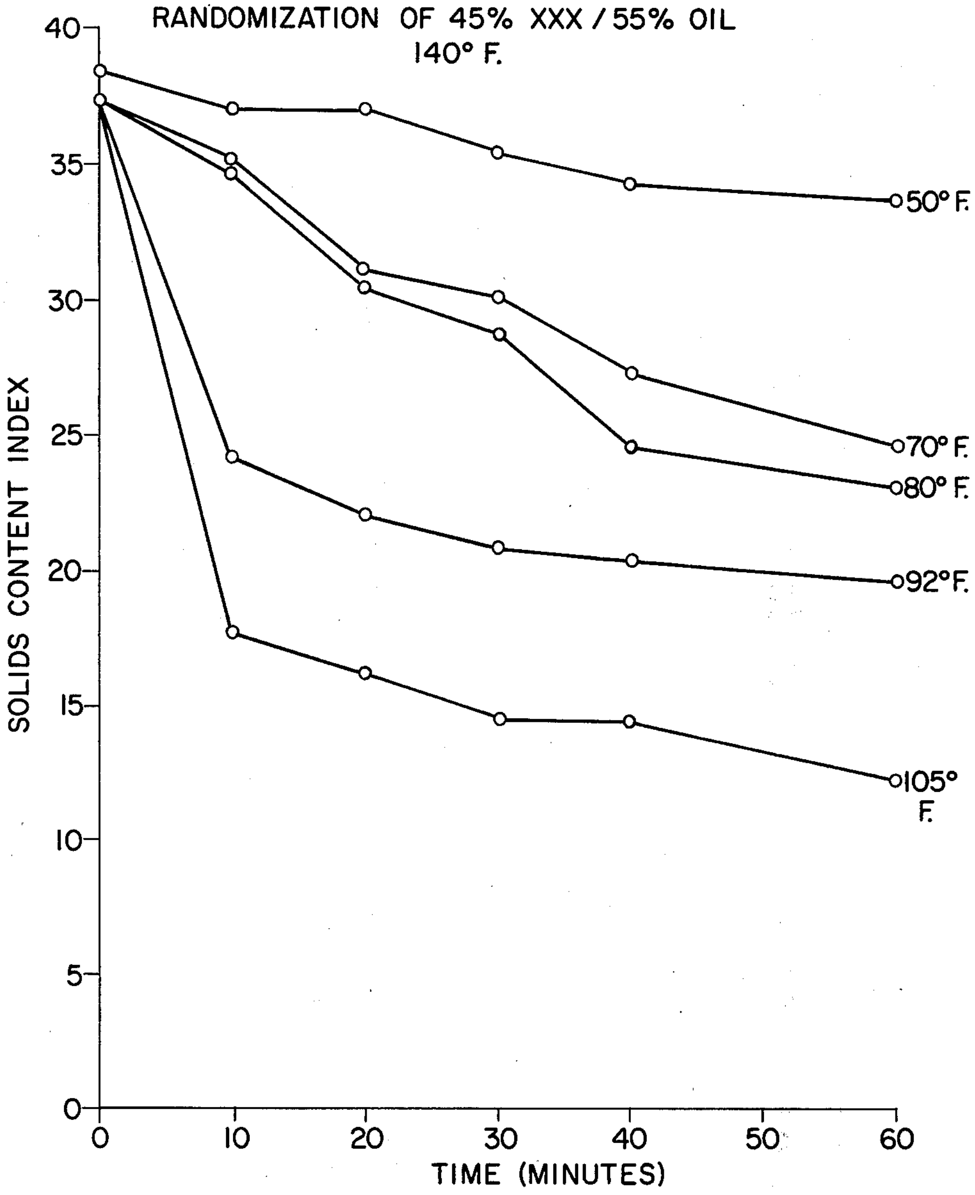
FIG. 4 represents a plot of solids content index versus time at various temperatures for a peanut oil/hardstock mixture randomized at a temperature of 140° F.
Figure 5:
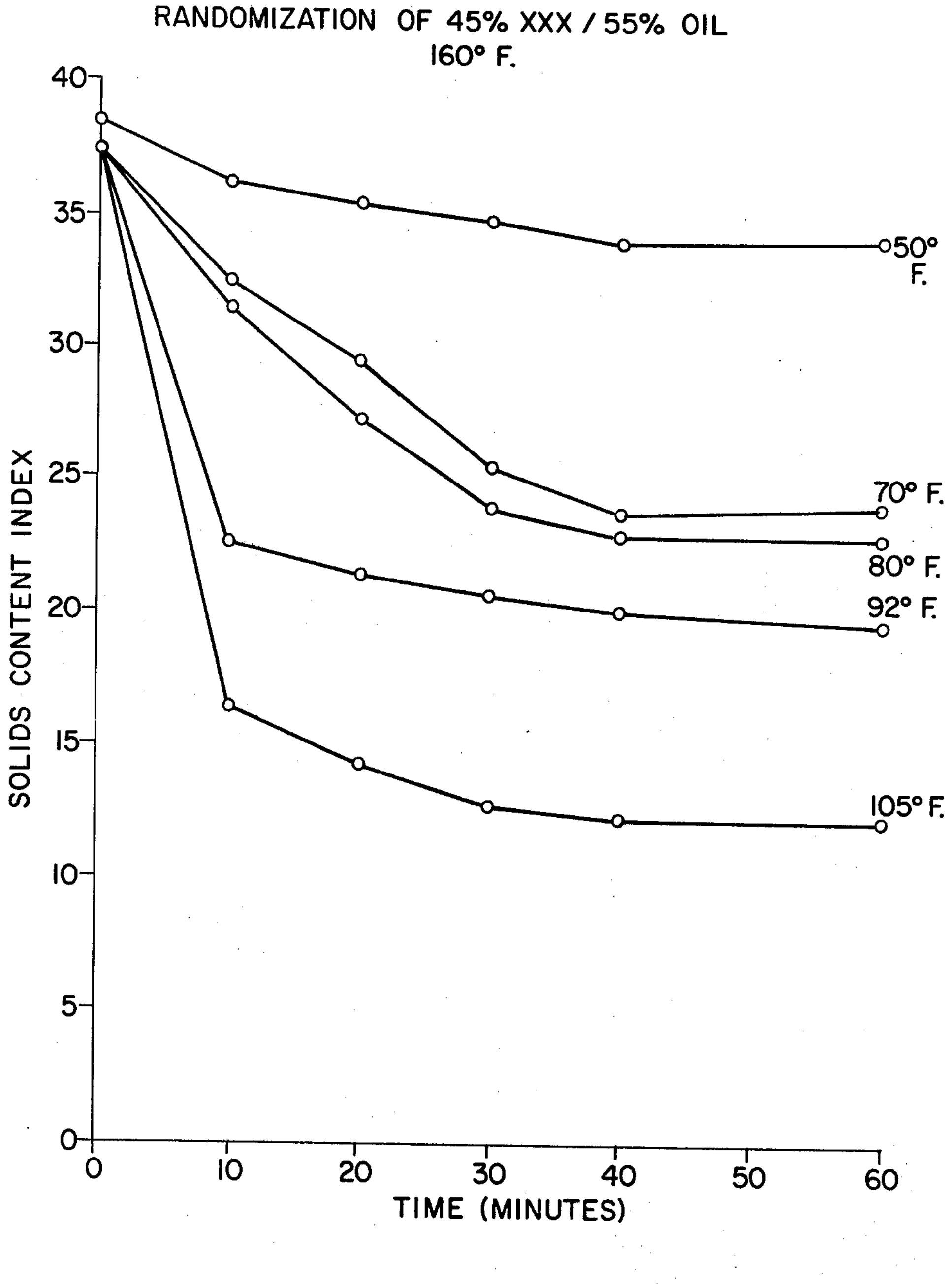
FIG. 5 represents a plot similar to that of FIG. 4 for a peanut oil/hardstock mixture randomized at a temperature of 160° F.
Figure 6:
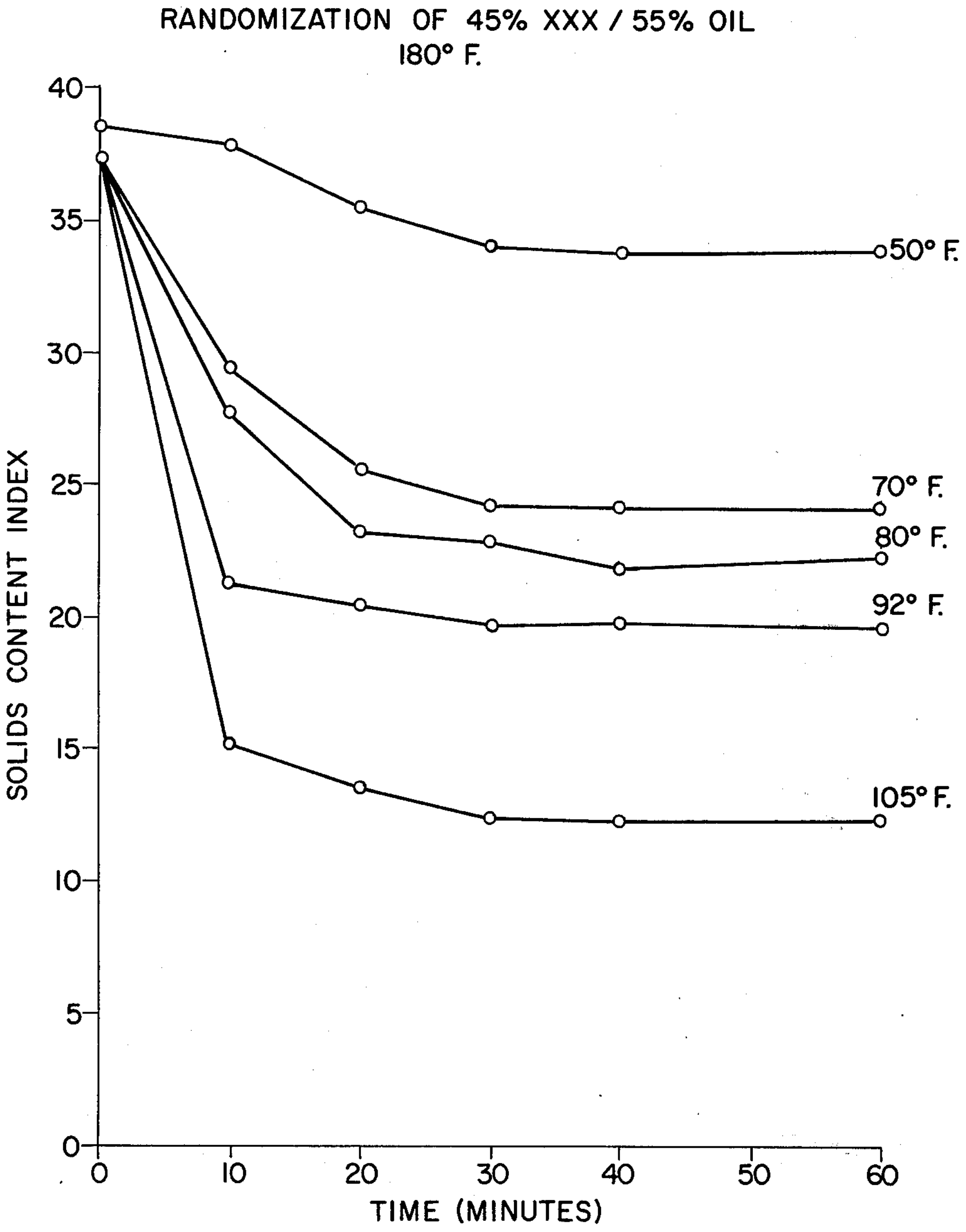
FIG. 6 represents a plot similar to that of FIGS. 4 and 5 for a peanut oil/hardstock mixture randomized at a temperature of 180° F.
Figure 7:
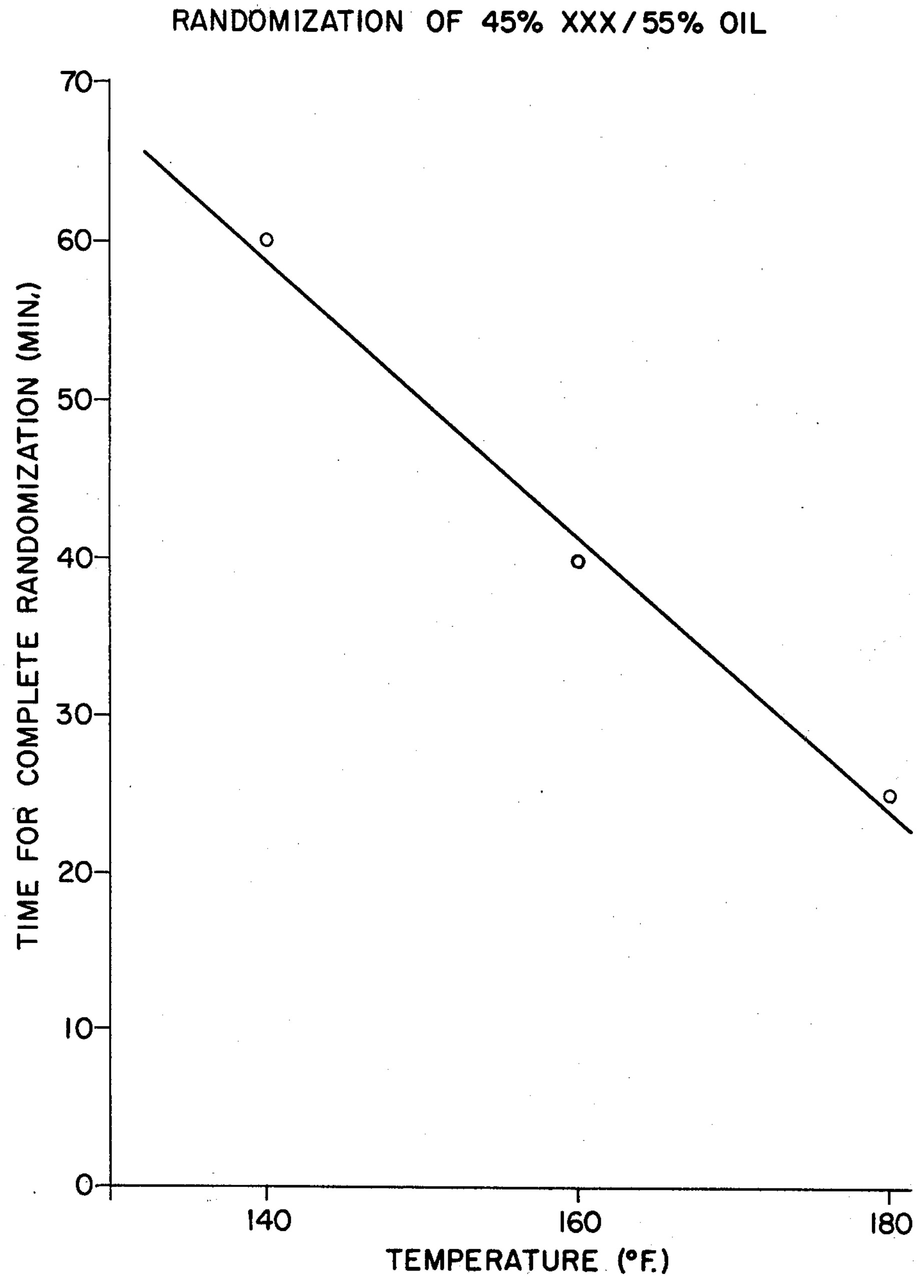
FIG. 7 represents a plot of time for complete randomization versus temperature for a peanut oil/hardstock mixture.

In all experiments, the dried oil, hardstock mixture was brought to temperature before the catalyst was added. The sodium methoxide catalyst at a level of 0.5% by weight was added by hand, the nitrogen blanket being turned off momentarily to prevent the catalyst, from being blown into the air. Within five minutes, the reaction mixture turned a light brown color which persisted throughout the reaction. As described above, SCI was used to follow the progress of the randomization reaction. FIGS. 4-6 show the change in SCI with time for various temperatures. FIG. 7 indicates the time required to reach equilibrium at various temperatures. In order to insure complete randomization, a rearrangement time of 45 minutes at 160° F. was used for pilot plant stabilizer production.

3. Neutralization

During the initial phases of experimentation, dilute hydrochloric acid was used to neutralize the sodium methoxide catalyst. A 1:10 $HCl:H_2O$ solution was added at 200% of the stoichiometric requirement. This neutralization results in the formation of sodium hydroxide (free sodium ion) which further reacts to form sodium soaps. After a 15 minute mixing period, the soap and water was removed by centrifugation, the oil water washed, centrifuged and vacuum dried. For two later runs, concentrated (85%+) phosphoric acid was used at 150% of stoichiometric requirement. After 15 minutes mixing the excess acid was allowed to settle out and was removed; the mixture was then filtered through guhr and vacuum dried. In both cases, the amount of residual soap and water was less than 0.03 and 0.06% respectively.

4. Fractionation (a) Determination of Hardstock/Oil Proportions

Figure 8:
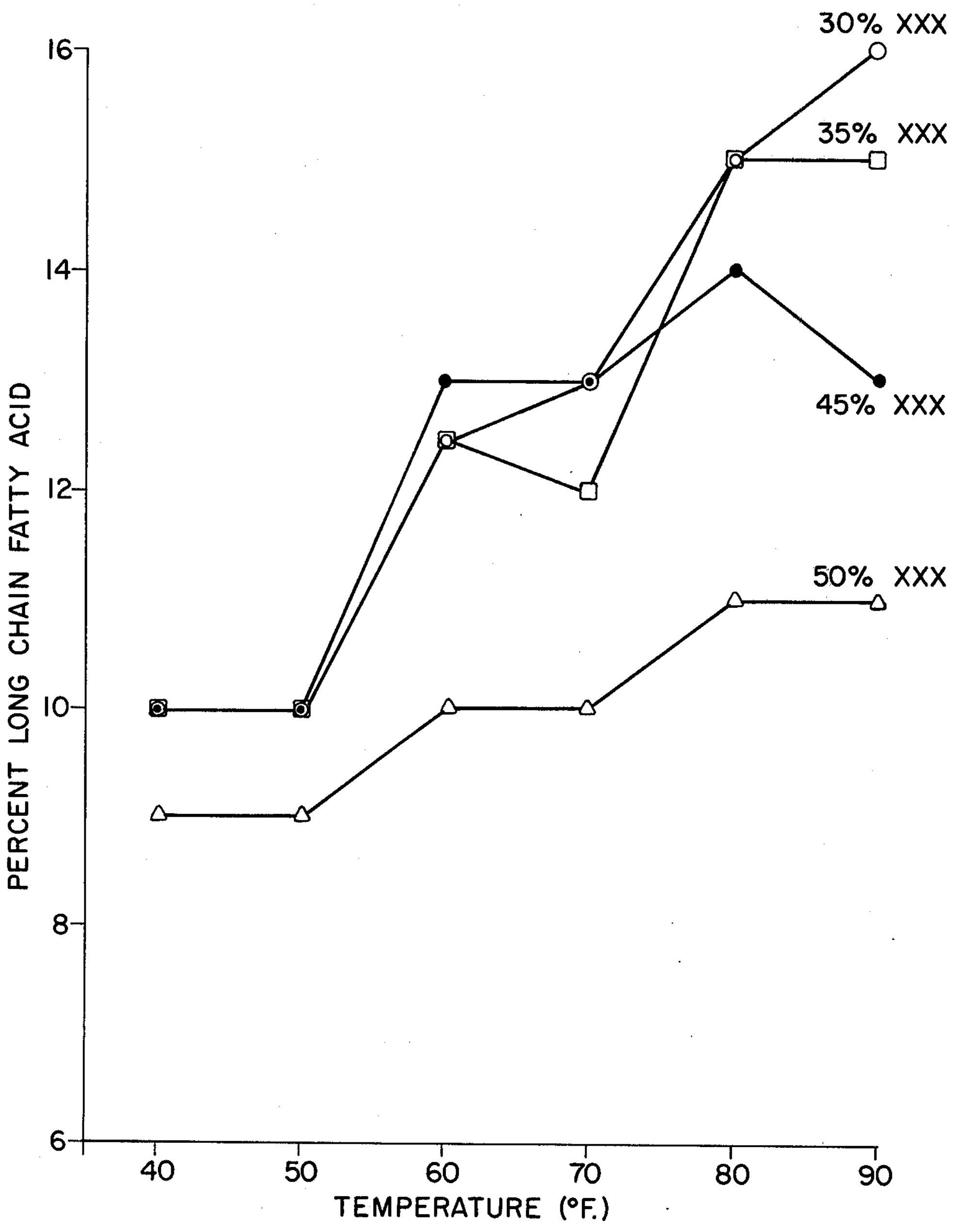
FIG. 8 represents a plot of percent long chain fatty acids versus fractional crystallization temperature for a randomized and fractionally crystallized peanut oil/hardstock mixture containing various initial levels of hardstock.

As indicated above, the solvent fractionation process was used to isolate the trisaturates and those disaturates which contain long chain fatty acids. The more hardstock used in the original mixture, the higher the yield of these "desirable" triglycerides will be but the lower their content of long chain fatty acids. Theoretically, 45% is the maximum amount of hardstock which will produce a solids fraction with greater than 12% long chain fatty acids after solvent fractionation. The yield of these solids should be about 22%. FIG. 8 shows that at 50° F. an actual fractionation from acetone gave almost precisely the calculated results for the 45% hardstock. For the lower hardstock mixtures (30 and 35%) the actual results are similar to those calculated. However, the yield of solids with sufficient long chain fatty acids was not as high as with the 45% hardstock mixture. The 50% hardstock mixture produced results clearly inferior to those of the 45% hardstock mixture, producing no fractionation product with sufficient long chain fatty acids. All subsequent work was done with 45% hardstock, 55% oil mixtures.

(b) Model Crystallizer Studies

Hexane is a preferred solvent. Randomly rearranged hardstock/oil (45%/55%) mixtures were fractionally crystallized in a small crystallizer. About 4000 grams of sample (oil plus solvent) was used; a hexane, dry ice bath provided cooling to the bottom and sides of the crystallizer; a special explosion proof, variable speed turbine agitator was obtained; a six bladed impeller was used; baffles were put into the crystallizer to promote mixing; a Buchner funnel connected to a vacuum pump was used to separate out the crystallized solids.

Figure 9:
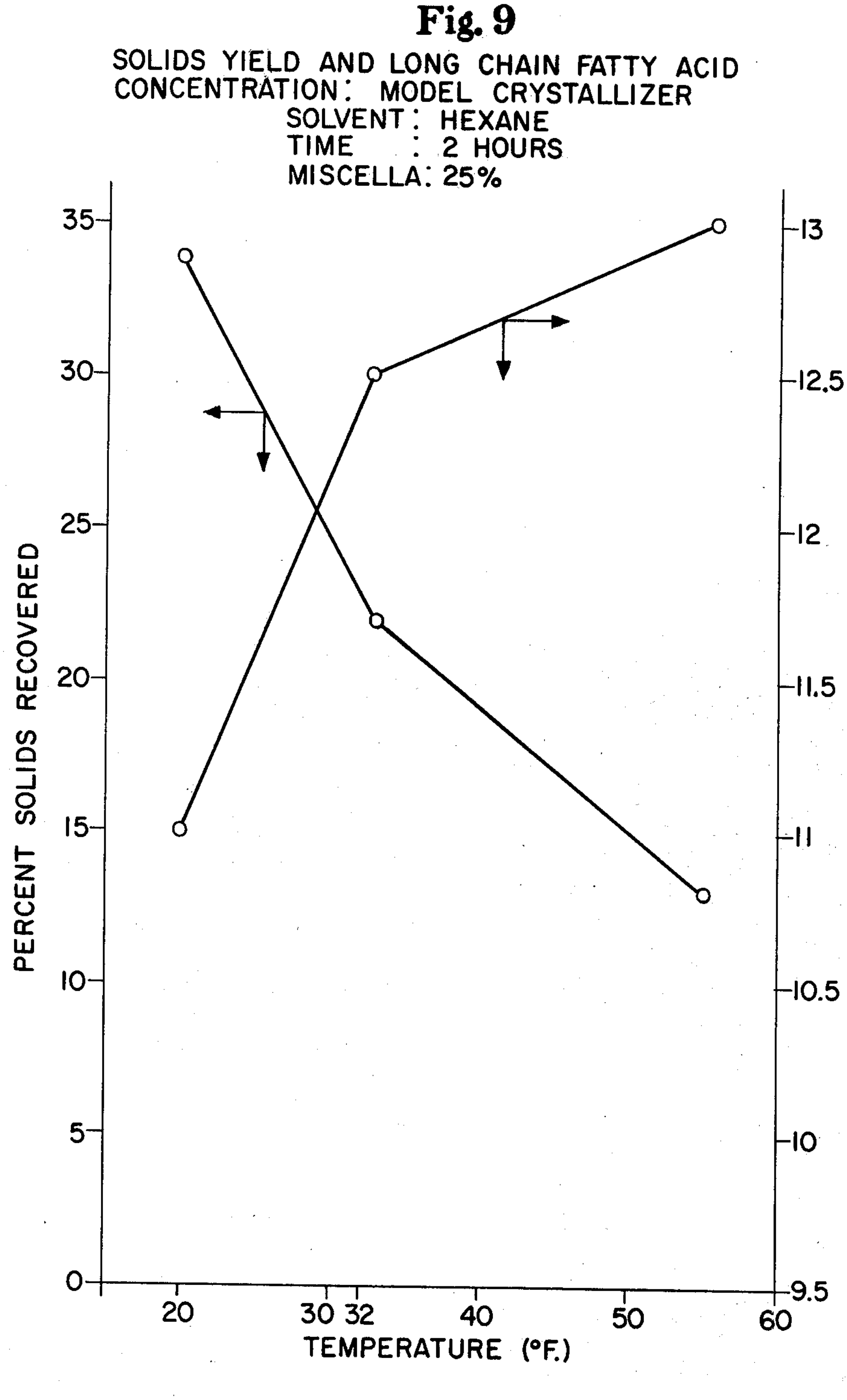
FIG. 9 represents plots of percent solids recovered and percent long chain fatty acids versus fractional crystallization temperature for a randomized and fractionally crystallized peanut oil/hardstock mixture.
Figure 10:
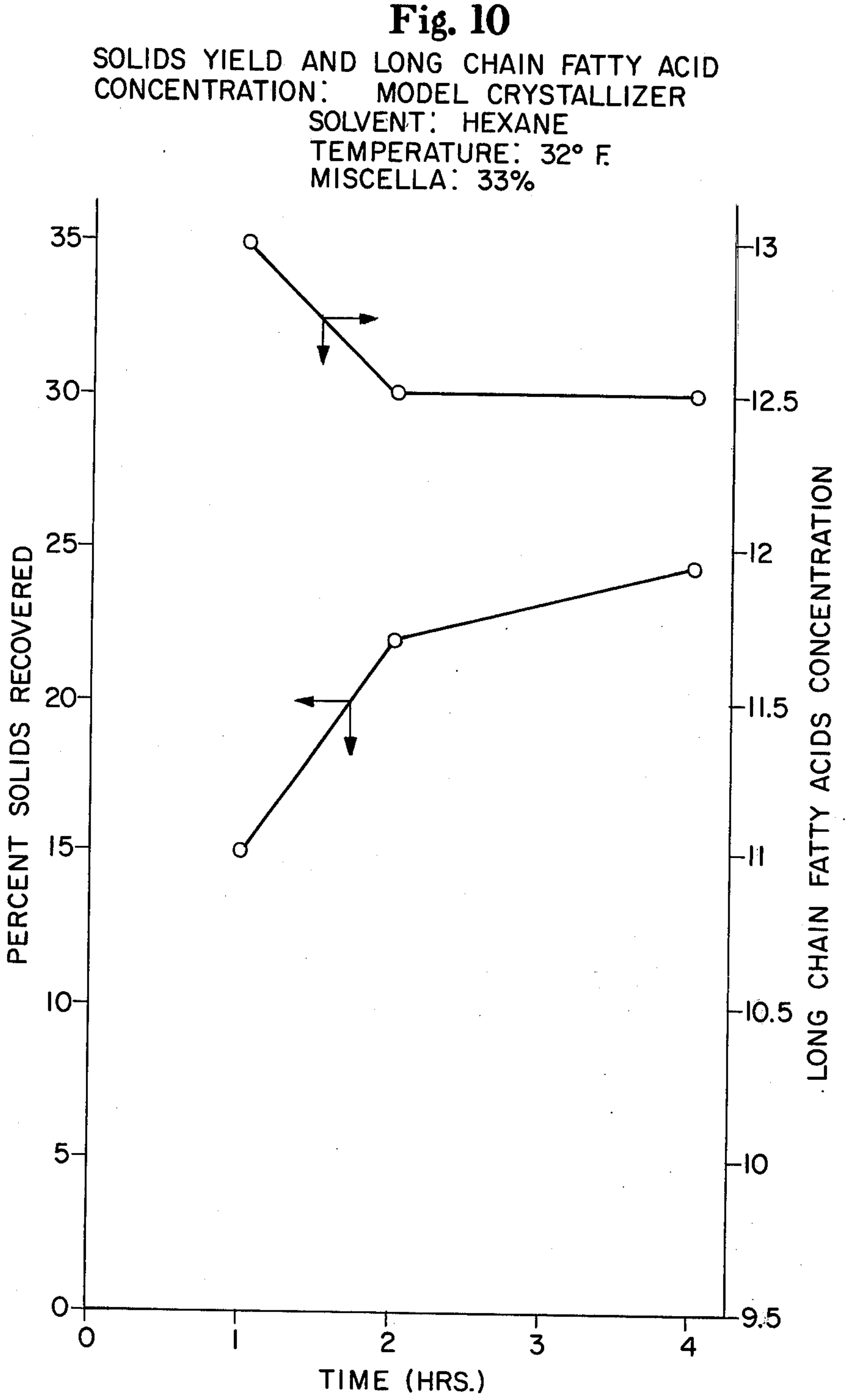
FIG. 10 represents plots of percent solids recovered and percent long chain fatty acids versus agitation time during fractional crystallization for a randomized and fractionally crystallized peanut oil/hardstock mixture.
Figure 11:
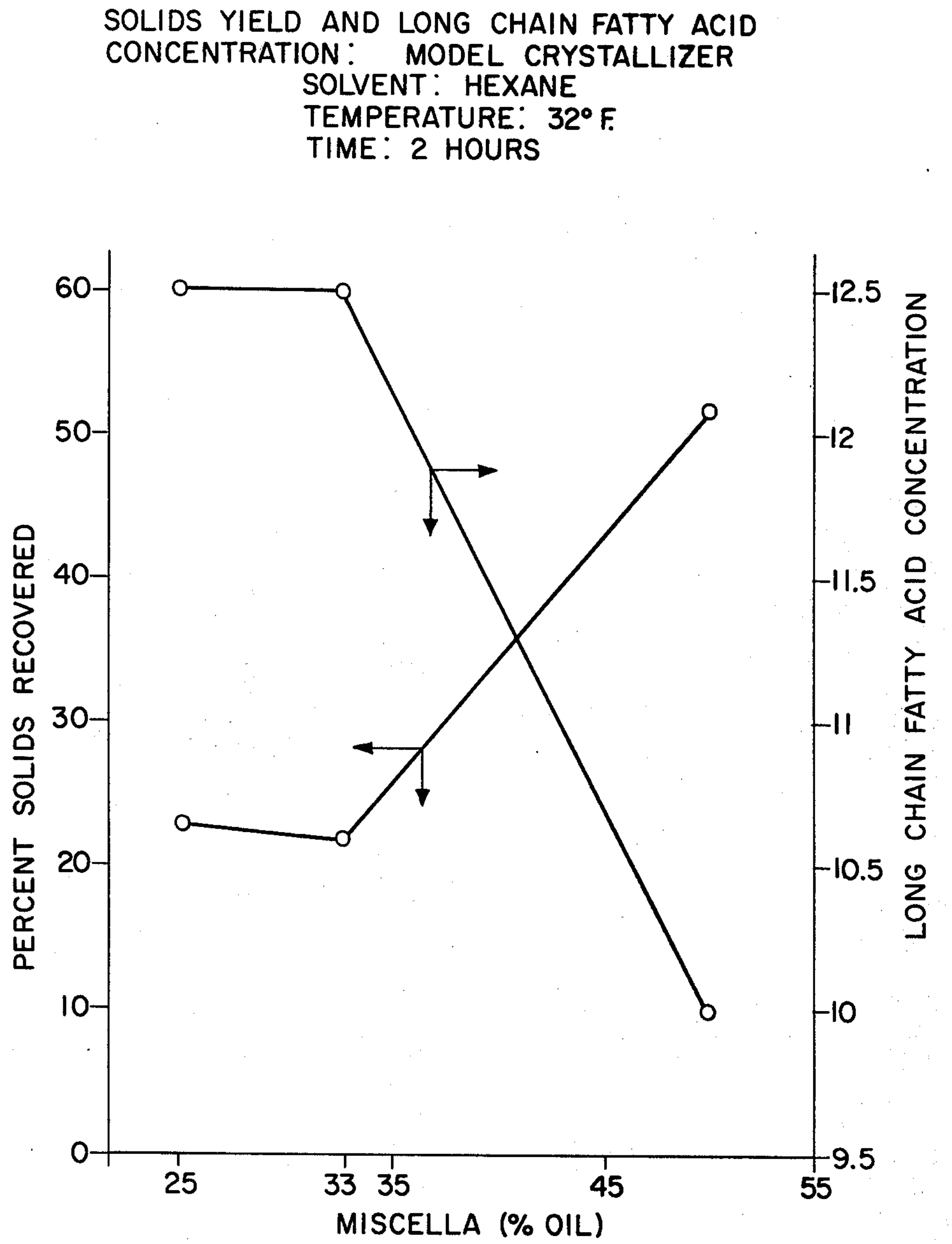
FIG. 11 represents a plot of percent solids recovered and percent long chain fatty acids versus miscella level during fractional crystallization for a randomized peanut oil/hardstock mixture.

Studies were conducted to determine the optimum crystallization temperature, time and miscella. The highest temperature possible was desired to limit cooling costs; the shortest crystallization time is needed to minimize crystallizer size; the maximum percentage of oil in solvent will limit crystallizer size and the solvent recovery apparatus. In the first series of experiments the temperature required to produce a 25% yield of solids (on an oil basis) was determined. The solids were analyzed by G.C. to insure that they contained at least 12.5% long chain fatty acids. FIG. 9 shows the results of these experiments; a temperature of 32° F. produces the maximum yield of about 22% solids with acceptable long chain fatty acid concentration, as calculated in FIG. 3. The minimum time required for the crystallization was then determined. FIG. 10 shows that about two hours of agitation were required for the fractional crystallization to be effected. FIG. 11 indicated that a 33% miscella is the optimum for maximum solids recrystallization. At higher oil levels it was virtually impossible to filter out the solids using the Buchner funnel. Since a vacuum drum filter is less efficient than the Buchner, a 25% miscella level was selected as preferred. A larger crystallizer could not be cooled to less than 55° F. so it was not possible to evaluate the scaleup from the model system at the selected operating point. Instead, a check of the scaleup was made using a 25% miscella crystallized at 55° F. for two hours. Separation of solids was accomplished with a standard plate and frame filter press. As indicated in the Peanut Butter Testing Section 7 below, peanut butter made with stabilizer from this run was satisfactory in all respects.

5. Production of Stabilizer for Peanut Butter Testing

The significant product characteristics of several lots of the stabilizer having at least 12.5% long chain fatty acids were as analyzed essentially identical for each lot produced.

6. Hardening

The solids collected from fractional crystallization were hydrogenated using 0.05% nickel catalyst to an iodine value of less than 4.

7. Testing in Peanut Butter

Extensive tests of the fractionated rearranged peanut oil stabilizer were carried out in a Standard R/S oil stabilizer context peanut butter system (formula given in Table 6 below). This peanut butter was designated R.

TABLE 6

FORMULA OF R

| Ingredient | Percent |
|---|---|
| Peanuts | 90.0 |
| Sucrose | 5.8 |
| Salt | 1.2 |
| Mono-, di-, and tri-glycerides (40/40/20) | 0.7 |
| Molasses | 0.5 |
| Fractionated Peanut Oil Stabilizer | 1.7-1.8 |
| Soybean Oil I-107D | 0.0-0.1 |

Considering specific processing variables:

(a) The effect of percentage (hardstock) on penetration within the 1.4 to 1.8% range was identical for the R any Standard peanut butter, [20MM/10 (penetration units) per 0.1% XXX].

(b) Penetration, viscosity, recovery at 70° F. after treatment at temperatures from 50° to 100° F. shows an improvement for R over the Standard peanut butter.

(c) Table 7 provides a comparison of the finished product characteristics of the R and Standard peanut butters. Particularly important is R's excellent resistance to softening after rough handling. Oil separation characteristics of the R peanut butter were also excellent.

(d) During aging studies of the R product, a loss of surface gloss was observed in some samples. These samples were extremely glossy when fresh but began to dull after two weeks to two month storage. Dulling continued for a period of time producing samples with either a completely dulled surface or many small dots evident on the surface. In both cases there was clearly an extremely slow fat recrystallization taking place. A method was developed to accelerate this dulling phenomenon. Samples were placed at 100° F. for 24 hours to melt the recrystallized fat and then transferred to 40° F. Periodically samples were transferred to 50°, 60° or 70° F.

After reviewing the exact process history of these batches of hardstock, it was discovered that they had been the only ones for which phosphoric acid had been used as the neutralizing agent. The possibility that the phosphoric acid had reacted to produce a constituent which had remained in the solids fraction after solvent crystallization and had slowly crystallized in the peanut butter was suspected. To test this theory, additional product was made using dilute hydrochloric acid as the neutralizing agent. Randomization and fractionation proceeded normally. Product made with the stabilizer had typical finished product characteristics. Some of the product was tested for gloss stability using the technique detailed above. No unusual loss in gloss occurred at 40° F. and that product returned to 70° F. had normal high gloss. Standard peanut butter control produced similar results.

TABLE 7

FINISHED PRODUCT CHARACTERISTICS

| Attribute | Standard | R |
|---|---|---|
| F.O.T. Effect | −1.5 MM/10 PER °F. | −2 MM/10 Per °F. |
| Picking Effect | −5 MM/10 PER MIN. | Variable ± 1.5 MM/10 PER MIN. |
| XXX Level Effect | 20 MM/10 PER 0.1% | 20 MM/10 PER 0.1% |
| XXX Level Required for Target Penetration | 1.4-1.6% | 1.6-1.8% |
| Gloss | 9+ | 9+ |
| % Beta | 80 | 80 |
| Penetration/Recovery | Basis | Sl. Better |
| Oil Separation | Basis | Equal |
| Rough Handling | Basis | Equal |
| Eating Quality | Basis | Equal |
| Cracking/Shrinkage | Basis | Equal |
| Tempering Time | 24 Hrs. | 24 Hrs. |

EXAMPLE III

In a preferred embodiment, starting with refined peanut oil, about 45% is essentially completely hydrogenated (iodine value less than 8). The hydrogenated peanut oil (hardstock) is combined with 55% unhydrogenated refined peanut oil and dried. The mixture is then randomly rearranged using sodium methoxide catalyst (9.5% by weight catalyst-150° F./45 minutes) to distribute the fatty acids randomly on the triglycerides present. The catalyst is neutralized with about 10% dilute (1:9) hydrochloric acid and the soap which is formed and removed in a standard refining/water washing operation. The rearranged oil is then fractionally crystallized from hexane (35° F./2 hours) and the solids collected on a vacuum drum filter. The isolated solids are essentially completely hydrogenated (iodine value less than 8) to make the stabilizer. The stabilizer is used in peanut butter at a level of 1.8%.

The preferred percentage of hardened peanut oil can vary from 30% to 70%. Any randomization technique can be used. For example, sodium metal or sodium potassium (NaK) can be substituted for sodium methoxide. Or, sodium hydroxide randomization under vacuum can be used. Any inorganic acid, dilute or concentrated can be used as the neutralizing agent. Acetone or other solvent can be used to fractionally crystallize the rearranged oil. Each particular hydrogenated oil level and type of solvent pair has a unique temperature which must be used for fractional crystallization to isolate the desired solids. The stabilizer can be used in peanut butter at levels of 1% to 5%.

Another preferred method of making said peanut butter stabilizer comprising the steps of: (a) randomly interesterifying a first mixture of 0% to 30% hydrogenated peanut oil and from 70% to 100% unhydrogenated peanut oil; (b) directly rearranging the interesterified first mixture to increase trisaturated by crystallization; (c) fractionally crystallizing from said first mixture of step (b), a second mixture of triglycerides having at least 10% fatty acids of from 20 to 24 carbon atoms; and (d) substantially, completely hydrogenating said second mixture to form said peanut butter stabilizer.

EXAMPLE IV

Fractionated Directed Rearrangement

Starting with refined peanut oil, about 15% is essentially completely hydrogenated (iodine value less than 8). The hydrogenated peanut oil is combined with 85% unhydrogenated refined peanut oil and dried. Sodium potassium metal (NaK) is then added at approximately 0.3% and this mixture held for about 15 minutes at 150° F. to randomly distribute the fatty acids on the triglycerides present. The oil-NaK is then quickly cooled to 55° F. and put into a large baffled crystallizer where it is held at 55° F.-60° F. for 4 hours. During this time directed rearrangement takes place; that is, the trisaturates formed by the randomization step crystallize out. As a result, the randomization reactions are driven (directed) toward production of more of these trisaturates. The NaK is then neutralized with 200% of the stoichiometrically required amount of hydrochloric acid. The soap which is formed is removed by a standard refining-/water washing process. The directed oil is then fractionally crystallized from acetone (50° F./4 hours) and the solids collected on a vacuum drum filter. The isolated solids are essentially completely hydrogenated (iodine value less than 8) to make the stabilizer which is used in peanut butter at a level of about 1.8%.

In the practice of the present invention, unrefined peanut oil can be used as the starting material. The percentage of hydrogenated peanut oil following the procedure set out in Example I can be varied from 0% to 30%. Any inorganic acid, dilute or concentrated can be used as the neutralizing agent. Hexane or other solvent can be used to fractionally crystallize the directed oil. It is pointed out again that each particular hydrogenated oil level and type of solvent pair has a unique temperature which must be used for fractional crystallization to isolate the desired solids. The stabilizer can be used in peanut butter at levels of 1% to 5%.

Functional Properties

The new peanut butter stabilizer produced entirely from peanut oil surprisingly has the same functional properties as the patented stabilizers described in U.S. Pat. No. 3,265,507, issued Aug. 9, 1966, No. 3,397,997, issued Aug. 20, 1968, No. 3,425,842, issued Feb. 4, 1969, and No. 3,425,843, issued Feb. 4, 1969, to all Japikse, and incorporated herein by reference in their entirety. The stabilizers in those patents comprise a stabilizer system comprised of mixtures of beta prime tending hardstocks which contain fatty acids of $C_{20}$ and longer chain length and beta tending hardstocks with average $C_{16}$ and $C_{18}$ chain length fatty acids. These hardstock mixtures, which must contain a critical level of the $C_{20}$-$C_{24}$ species, no more and no less than the critical levels, cocrystallize with a very small crystal size which creates oleaginous gels rather than interlinked rigid crystal matrices in peanut butters and other nutritious spreads. It is this peculiar feature that has consumer perceived significant test wins for flavor and eating quality over other stabilized peanut butters and allows far more stable penetration behavior and spreadability quality in the trade than other peanut butter systems.

The above-listed series of patents all are based on the use of mixtures of hydrogenated soybean oil and rapeseed oil. The rapeseed oil is the $C_{20}$-$C_{24}$ contributing component. Rapeseed oil generally contains from 20-50% of the longer chain ($C_{20}$-$C_{24}$) fatty acids and is used at levels which result in a long chain fatty acid range of 12.5%-25% (by weight) of the total fatty acids present in the stabilizer.

Peanut oil makes, when hardened, a beta tending hardstock. It is different from other beta tending oils in that it contains up to 6% $C_{20}$, $C_{22}$ and $C_{24}$ fatty acids. While this level is too low and the distribution of these fatty acids on the glycerol moiety is not functional in the sense of the patents listed above, it has been found during the course of experimental work that, surprisingly, it is possible to enrich the long chain fatty acids to a level around 12½%, that makes it possible to match the previously invented stabilizer in functionality with a hydrogenated fraction of "enriched" peanut oil.

This finding was surprising in that this fraction would behave as found. The preferred enriched peanut oil fraction is prepared by molecular "co-rearrangement" of a critical mixture of peanut oil and hardened peanut oil followed by fractional crystallization.

Such a product is different from rapeseed oil/soybean oil mixtures in fatty acid distribution, but after hardening behaves almost identical to the hardened rapeseed/-soybean mixture in peanut butter as described herein.

A process for making a peanut butter stabilizer from peanut oil has been discovered. The process includes random and directed rearrangement of a critical mixture of unhydrogenated peanut oil, peanut oil hardstock followed by fractional crystallization to isolate the effective fraction with long chain fatty acids at least 10% by weight of the total fatty acids present in the fraction.

Evaluations in a standard context peanut butter indicate that the stabilizer of this invention produces a product substantially identical in finished product characteristics to a standard rapeseed/soybean oil stabilized peanut butter.

The present invention is a unique stabilizer for peanut butter made from a single starting material, peanut oil. The triglyceride isomers present in peanut oil are substantially modified and a selected portion of those triglycerides isolated. Peanut butters containing these specific, selected triglycerides have properties different from those made with hydrogenated peanut oil. It was unexpected that this fraction of peanut oil could be used in peanut butter to make a product which is extremely stable, has a high peanut flavor impact, excellent eating quality and excellent spreadability.

What is claimed is:

1. A method of preparing an enriched, hydrogenated peanut-oil based peanut butter stabilizer comprising the steps of:

(a) randomly interesterifying (randomizing) a first mixture of from about 0% to about 70% hydrogenated peanut oil (hardstock) and from about 30% to about 100% unhydrogenated peanut oil;

(b) fractionally crystallizing from the randomly interesterified first mixture a second mixture of triglycerides having at least 10% long chain fatty acids having from 20 to 24 carbon atoms; and (c) substantially completely hydrogenating said second mixture to an iodine value less than about 8 to form said enriched hydrogenated peanut oil-based peanut butter stabilizer.

2. The method of claim 1 wherein said first mixture contains from about 30% to about 70% hydrogenated peanut oil and from about 30% to about 70% unhydrogenated peanut oil.

3. The method of claim 1 wherein said first mixture contains from about 0% to about 30% hydrogenated peanut oil and from about 70% to about 100% unhydrogenated peanut oil, and wherein random interesterification of step (a) is directed.

4. The methods of claims 1, 2 or 3, wherein said enriched hydrogenated peanut oil-based stabilizer comprises at least $2\frac{1}{2}\%$ long chain fatty acid triglycerides.

5. The peanut butter stabilizer of claims 1, 2 or 3, wherein said enriched hydrogenated peanut oil-based stabilizer comprises at least 14% long chain fatty acid triglycerides.

6. The method of claims 1, 2 or 3 wherein said hydrogenated peanut oil (hardstock) of step (a) has an iodine value of less than 8.

7. The method of claims 1, 2 or 3 wherein said second mixture is fractionally crystallized from a solvent selected from the group consisting of hexane, acetone, methanol, ethanol, chloroform and similar organic solvents.

8. The method of claims 1, 2 or 3 wherein said second mixture is fractionally crystallized from hexane.

9. The method of claims 1, 2 or 3 wherein said second mixture is fractionally crystallized from acetone.

* * * * *